US010095471B2

(12) United States Patent
Dwivedi et al.

(10) Patent No.: US 10,095,471 B2
(45) Date of Patent: Oct. 9, 2018

(54) CONTEXT AWARE VOICE INTERFACE FOR COMPUTING DEVICES

(71) Applicant: Oracle International Corporation, Redwood Shores, CA (US)

(72) Inventors: Vinay Dwivedi, San Carlos, CA (US); Seth Stafford, San Carlos, CA (US); Daniel Valdivia Milanes, Belmont, CA (US); Fernando Jimenez Lopez, Zapopan (MX); Brent-Kaan William White, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1012 days.

(21) Appl. No.: 14/475,344

(22) Filed: Sep. 2, 2014

(65) Prior Publication Data
US 2015/0089373 A1  Mar. 26, 2015

Related U.S. Application Data

(60) Provisional application No. 61/880,732, filed on Sep. 20, 2013.

(51) Int. Cl.
*G06F 3/0484* (2013.01)
*G06F 3/16* (2006.01)

(52) U.S. Cl.
CPC .................. *G06F 3/167* (2013.01)

(58) Field of Classification Search
CPC .......... G06F 3/00; G06F 3/048; G06F 3/0484; G06F 3/04842; G06F 3/16; G06F 3/167
See application file for complete search history.

(56) References Cited

U.S. PATENT DOCUMENTS

| 7,167,910 | B2 | 1/2007 | Farnham et al. |
| 7,197,741 | B1 | 3/2007 | Stapf |
| 7,921,156 | B1 | 4/2011 | Stolorz et al. |
| 8,645,122 | B1* | 2/2014 | Di Fabbrizio ......... G10L 21/00 704/231 |
| 9,437,206 | B2* | 9/2016 | Yu ....................... G10L 15/1822 |
| 2002/0062216 | A1* | 5/2002 | Guenther ................ G06F 3/167 704/270.1 |

(Continued)

FOREIGN PATENT DOCUMENTS

JP           2004133495 A      4/2004

*Primary Examiner* — Xiomar L Bautista
(74) *Attorney, Agent, or Firm* — Trellis IP Law Group, PC

(57) ABSTRACT

A system and method for facilitating user access to software functionality, such as enterprise-related software applications and associated data. An example method includes receiving language input responsive to one or more prompts; determining, based on the language input, a subject category associated with a computing object, such as a Customer Relationship Management (CRM) opportunity object; identifying an action category pertaining to a software action to be perform pertaining to the computing object; employing identification of the software action to obtain action context information pertaining to the action category; and implementing a software action in accordance with the action context information. Context information pertaining to a software flow and a particular computing object may guide efficient implementation of voice-guided software tasks corresponding to the software flows.

19 Claims, 10 Drawing Sheets

(56) References Cited

U.S. PATENT DOCUMENTS

| | | |
|---|---|---|
| 2005/0203757 A1 | 9/2005 | Lei et al. |
| 2006/0173985 A1 | 8/2006 | Moore |
| 2007/0067725 A1 | 3/2007 | Cahill et al. |
| 2007/0156809 A1 | 7/2007 | Dickinson et al. |
| 2007/0208751 A1 | 9/2007 | Cowan et al. |
| 2015/0066479 A1* | 3/2015 | Pasupalak ............... G06F 17/27 704/9 |
| 2015/0210287 A1* | 7/2015 | Penilla ................. B60W 40/08 701/49 |

* cited by examiner

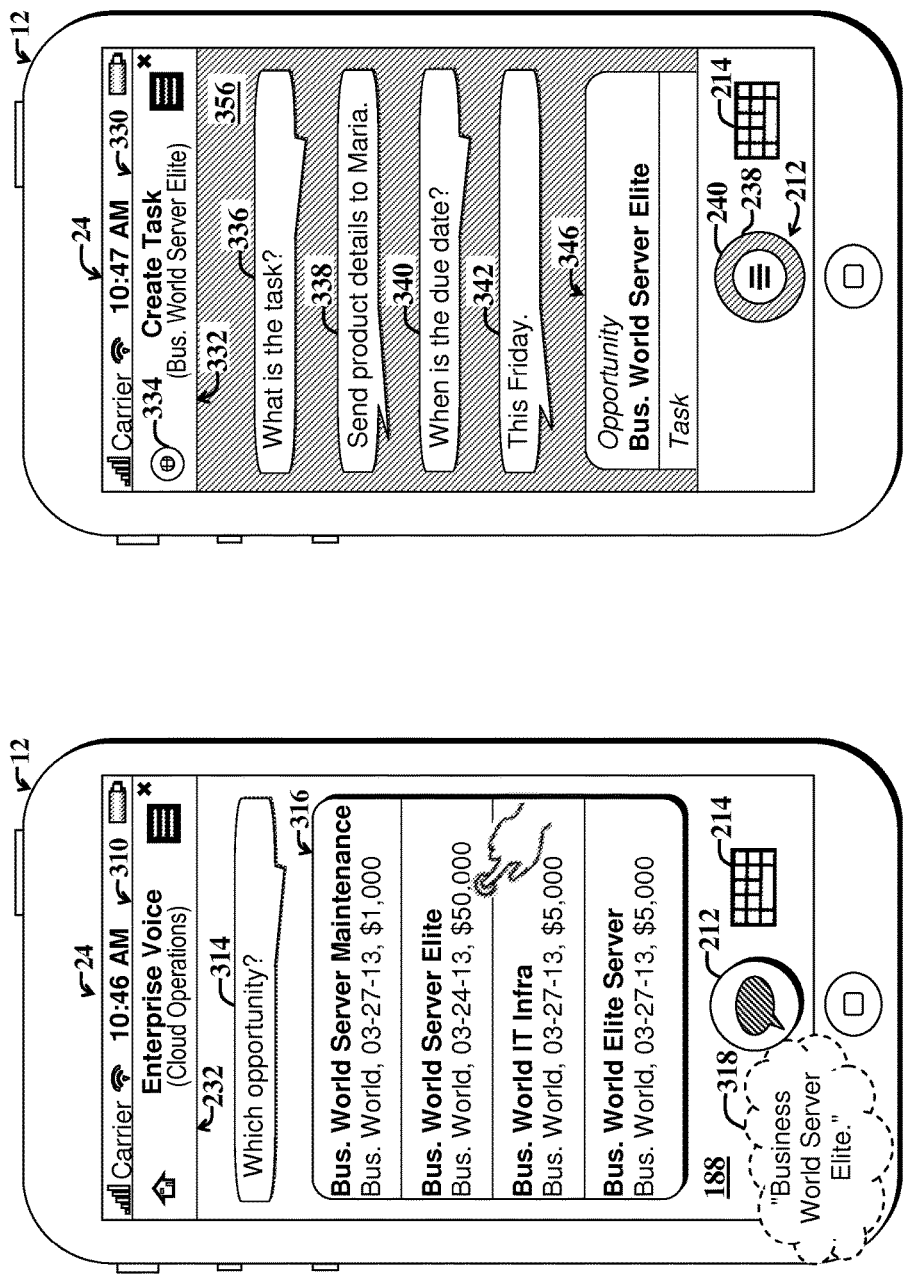

CONTEXT AWARE VOICE INTERFACE FOR COMPUTING DEVICES

CROSS REFERENCES TO RELATED APPLICATIONS

This application claims priority from U.S. Provisional Patent Application Ser. No. 61/880,732, entitled CONTEXT AWARE VOICE INTERFACE FOR COMPUTING DEVICES, filed on Sep. 20, 2013, which is hereby incorporated by reference as if set forth in full in this application for all purposes.

This application is related to the following applications: U.S. patent application Ser. No. 13/715,776, entitled NATURAL LANGUAGE PROCESSING FOR SOFTWARE COMMANDS, filed on Dec. 14, 2012; U.S. patent application Ser. No. 13/842,982, entitled SYSTEM FOR ACCESSING SOFTWARE FUNCTIONALITY, filed on Mar. 15, 2013; and U.S. patent application Ser. No. 14/033,052, entitled ENHANCED VOICE COMMAND OF COMPUTING DEVICES, filed on Sep. 20, 2013; which are incorporated by reference as if set forth in full in this application for all purposes.

BACKGROUND

The present application relates to software and more specifically to user interfaces and accompanying methods that facilitate user voice interaction with software.

Voice enabled software is employed in various demanding applications, including voice activated call center software for handling telephonic customer service requests, foreign language translation software, speech-to-text translators, and general voice-enabled software, such as Siri®. Such applications often demand user friendly interfaces that enable efficient user access to data and software functionality.

Efficient mechanisms for navigating potentially complex software architectures are particularly important in enterprise applications, such as Customer Relationship Management (CRM) applications, where rapid performance of software actions and data input/output operations can be particularly important, such as when a customer is waiting on hold.

In an example enterprise CRM call center application, incoming telephone calls are routed based on spoken responses to software-generated prompts. The underlying software may employ generic menus, whereby users select different options by speaking their selections. The software may then generate predetermined spoken responses based on the provided input, and then route the call accordingly. However, such systems often lack efficient mechanisms for leveraging available information to further customize responses, enhance user experience, and enable efficient task completion.

Other voice-enabled systems, such as Siri®, are often device-focused, where user interactions may be confined to predetermined software actions based on generically available device information. Furthermore, with such systems, users must often perform several interactions to complete complex tasks. Often, the software applications must be exited and reactivated to complete different parts of a complex or multi-step task, which can be time consuming.

In general, the enterprise applications often lack efficient voice-enabled software applications and accompanying systems and user interface architectures that enable rapid completion of complex tasks involving software navigation, data access, data input, and/or other software actions.

SUMMARY

An example method facilitates user interaction with enterprise software, leveraging various types of context information to enable efficient completion of software tasks, such as accessing, editing, and augmenting data, and performing enterprise-related software actions. The example method includes receiving language input responsive to one or more prompts; determining, based on the language input, a subject category; obtaining subject context information based on a computing object associated with the subject category; identifying an action category pertaining to a software action to be perform pertaining to the computing object; employing identification of the software action to obtain action context information pertaining to the action category; and implementing a software action in accordance with the action context information.

In a more specific embodiment, user identity information is employed to determine additional user context information, including data accessible to the user via the underlying software. The data may include, for example, enterprise data maintained via one or more computing objects that the user has permissions to access.

The specific example method further includes employing a computing object to represent the subject category, such that user selection of the subject category results in user selection of the computing object. The computing object includes an opportunity object used to maintain enterprise data, such as sales data accessible to a Customer Relationship Management (CRM) database.

The language input or instance thereof may indicate the action category and associated action context information. The action context information is characterized by a software flow, such that aspects of (e.g., steps in) the software flow provide the action context information.

The specific example method further includes indicating, via visual encoding in a user interface display screen, a flow that is currently being implemented by underlying software used to implement the method. The software flow may include one or more sequences of steps that are adapted to facilitate implementation of the identified software action. Examples of software actions include displaying contacts associated with the user, editing an opportunity object, displaying (for viewing) data pertaining to one or more opportunity objects, displaying/viewing data pertaining to a task, viewing a note, creating a note, creating an appointment, and so on.

The specific example method further includes employing the language input to determine one or more data parameters to be associated with a computing object and a software action pertaining to a software flow. The software flow identifies action context information, and the computing object determines a subject context. The subject context and the action context facilitate interpretation of subsequently provided language input.

Language input is partitioned into one or more categories, including the action category and/or a parameter category. A portion of language input characterizing an action category includes a specification of a software action applicable to the computing object associated with the subject category. Similarly, a portion of language input characterizing one or more parameters associated with the parameter category includes a specification of information to be stored in association with the computing object. For example, the specified information may include details of a note, wherein the note details represent one or more parameters, and wherein the note pertains to a particular opportunity object (which provides the subject context).

During a given voice interaction, the associated user interface display screen may exhibit different colors (or other visual encoding) to indicate which flow, i.e., action category and associated action context that is currently applicable to the user interaction. Additional visual coding, such as a highlighted voice button or widget, may indicate when the underlying software is receiving voice input. Such visual encoding provides a feedback of context information to the user to enhance user interaction with the software.

Hence, certain embodiments discussed herein facilitate efficient access to cloud-based enterprise data and functionality in part by streamlining language-based interactions by leveraging available enterprise information, including user specific information, data-specific information, and software application-specific information (e.g., an indication of a software flow being implemented), to facilitate efficient software navigation and access to data and functionality.

With knowledge of context information, such as which tasks users typically perform, appropriate user selectable conversational flows may be developed. Flows may be selected, in part, based on user-selected subjects corresponding to different CRM opportunity objects. By leveraging unique enterprise context information, subsequently selected task flows are structurable in accordance with an understanding of the underlying enterprise data. User voice interaction along a given flow is then directable in accordance with action context information associated with the flow.

Completion of a given flow may result in completion of a given task, thereby facilitating completion of a potentially complex task via a single pass using the system, as opposed to periodically stopping and restarting the system, as may otherwise be required with use of conventional language-enabled software. Potentially complex software action flows can be dynamically activated based on relatively few spoken words.

Use of context information as discussed herein may further reduce requisite software language prompts and user voice responses needed to navigate to specific data and implement specific tasks related to the data being navigated to.

A further understanding of the nature and the advantages of particular embodiments disclosed herein may be realized by reference of the remaining portions of the specification and the attached drawings.

BRIEF DESCRIPTION OF THE DRAWINGS

FIG. 8 illustrates a seventh example user interface display screen, which represents an opportunity confirmation screen appearing after a user has spoken a command to create a task for a particular opportunity from the sixth example user interface display screen of FIG. 7.

FIG. 9A illustrates an eighth example user interface displays screen illustrating an example user interaction to create a task after a user has selected an opportunity from the seventh example user interface display screen of FIG. 8.

DETAILED DESCRIPTION OF EMBODIMENTS

For the purposes of the present discussion, an enterprise may be any organization of persons, such as a business, university, government, military, and so on. The terms "organization" and "enterprise" are employed interchangeably herein. Personnel of an organization, i.e., enterprise personnel, may include any persons associated with the organization, such as employees, contractors, board members, customer contacts, and so on.

An enterprise computing environment may be any computing environment used for a business or organization. A computing environment may be any collection of computing resources used to perform one or more tasks involving computer processing. An example enterprise computing environment includes various computing resources distributed across a network and may further include private and shared content on intranet web servers, databases, files on local hard discs or file servers, email systems, document management systems, portals, and so on.

Enterprise software may be any set of computer code that is adapted to facilitate implementing any enterprise-related process or operation, such as managing enterprise resources, managing customer relations, and so on. Example resources include Human Resources (HR) (e.g., enterprise personnel), financial resources, assets, employees, business contacts, sales data, and so on, of an enterprise. The terms "enterprise software" and "enterprise application" may be employed interchangeably herein. However, an enterprise application may include one or more enterprise software modules or components, such as user interface (UI) software modules or components.

Enterprise software applications, such as Customer Relationship Management (CRM), Business Intelligence (BI), Enterprise Resource Planning (ERP), and project management software, often include databases with various database objects, also called data objects or entities. For the purposes of the present discussion, a database object may be any computing object maintained by a database.

Enterprise data may be any information pertaining to an organization or business, including information about customers, appointments, meetings, opportunities, customer interactions, projects, tasks, resources, orders, enterprise personnel and so on. Examples of enterprise data include work-related notes, appointment data, customer contact information, descriptions of work orders, asset descriptions, photographs, contact information, calendar information, enterprise hierarchy information (e.g., corporate organizational chart information), and so on.

For clarity, certain well-known components, such as hard drives, processors, operating systems, Internet service providers, power supplies, and so on, have been omitted from the figures. However, those skilled in the art with access to the present teachings will know which components to implement and how to implement them to meet the needs of a given implementation.

Figure 1:
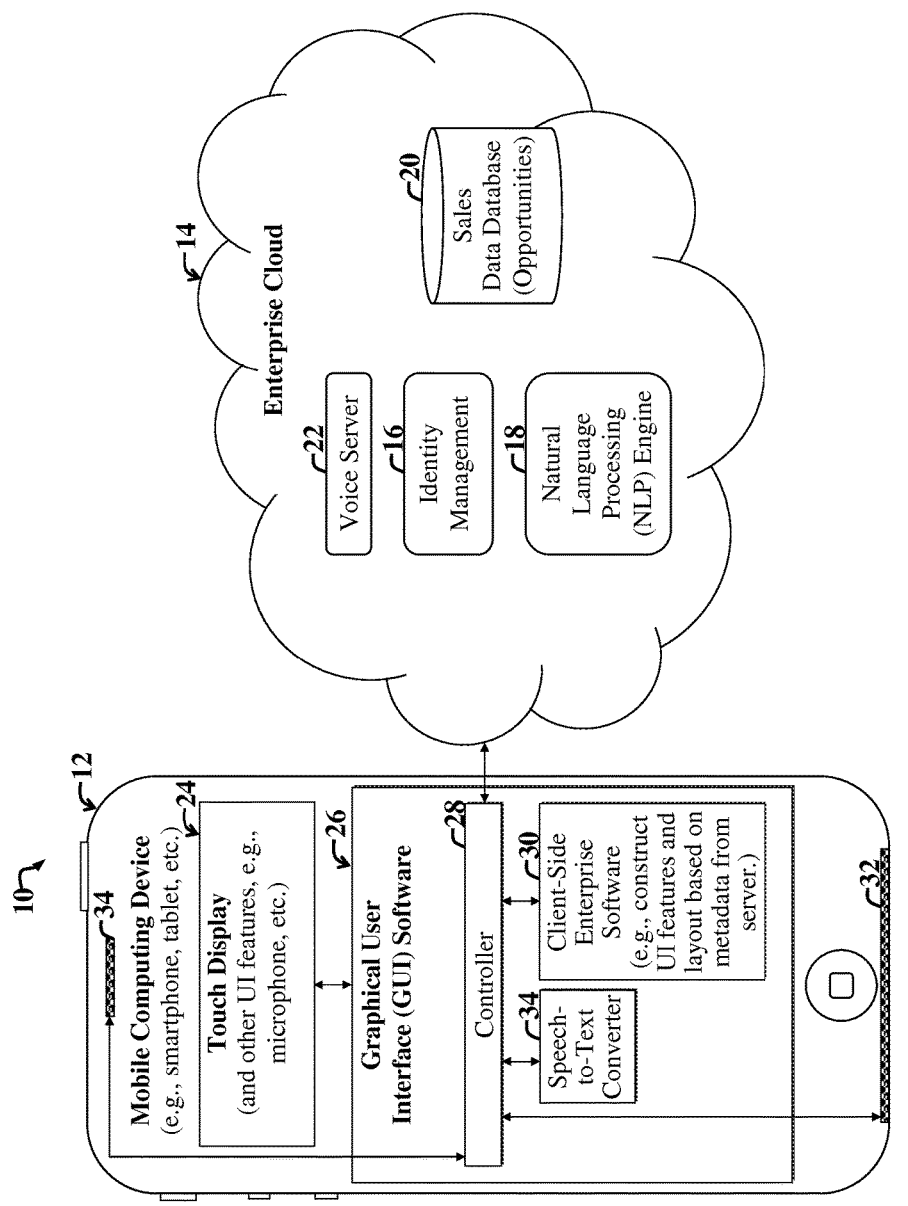
FIG. 1 is a diagram of an example system that employs natural language input and context information, including subject context, usage context, and user information, to facilitate user interaction with enterprise software.

FIG. 1 is a diagram of an example system 10 that employs natural language input, such as voice, i.e., speech, and context information, including subject context, usage context, and user information, to facilitate user interaction with enterprise software 26, 14-22.

For the purposes of the present discussion, natural language may be any speech or representation of speech, i.e., spoken or written language. Similarly, natural language input may be any instruction, request, command, or other information provided via spoken or written human language to a computer. Examples of language input usable with certain embodiments discussed herein include voice commands, voice data, text messages (e.g., Short Message Service (SMS) text messages), emails containing text, direct text entry, and so on. The terms "natural language input" and "language input" may be employed interchangeably herein. Similarly, the terms "voice" and "speech" are employed interchangeably herein.

Context information may be any information that is auxiliary to language input or auxiliary to other input provided by a user during a given user interaction with software. The terms "context information" and "context" may be employed interchangeably herein.

For example, user context information may include information associated with a user who is providing language input. Examples of user include login credentials, which are employed to access user information, i.e., user context, e.g., pertaining to software permissions specifying which data and/or software functionality may be accessible to the user.

Similarly, software context may include subject context information, e.g., information pertaining to computing objects representing current subject matter addressed by software functionality presented via a UI display screen. The software context may further include action context information. Action context information may include, for example, information characterizing a software flow that is currently being implemented via the software and indicated via one or more UI display screen features presented during the course of the software flow or particular user interaction sequence.

The system 10 includes a mobile computing device 12, such as smartphone, in communication with a cloud 14 and various components 16-22 thereof. For the purposes of the present discussion, a mobile computing device may be any computer that is adapted for portable use. In general, a computing device may be any computer. A computer may be any processor coupled to memory. Examples of mobile computing devices include laptops, notebook computers, smartphones and tablets (e.g., iPhone®, iPad®, Galaxy Tab®, Windows® Phone™ smartphones and tablets, Android® smartphones tablets, BlackBerry® smartphones, etc.), and so on. Various specific example embodiments discussed herein may employ a mobile computing device further equipped with various features, such as a camera, a network connection, Global Positioning System (GPS) receiver, gyroscope, compass, and user input functionality, such as a touch screen and/or or qwerty keypad. The terms "mobile device" and "mobile computing device" are employed interchangeably herein.

A cloud may be any collection of one or more servers. Cloud-based enterprise data may be any data that is stored on one or more servers and pertains to a business or otherwise represents enterprise data. A server may be any computing resource, such as a computer and/or software that is adapted to provide content, e.g., data and/or functionality, to another computing resource or entity that requests it, i.e., the client. A client may, such as the mobile device 12, may be any computer or system that is adapted to receive content from another computer or system, i.e., a server. A server system, such as that which may implement the cloud 14, may be any collection of one or more servers and accompanying computing resources.

The example cloud 14 includes an identity management system 16, a Natural Language Processing (NLP) engine 18, a sales data database 20, and a voice server 22, which may intercommunicate and which may communicate with Graphical UI (GUI) software 26 running on the mobile device 26. The example GUI software 26, which may be implemented via a browser, includes a controller 28 in communication with client-side enterprise software 30. The example mobile device 12 further includes a touch display 24, a microphone 32, and a speaker 34, in communication with the client-side GUI software 26.

The client-side enterprise software 30 includes computer code that is adapted to facilitate constructing or generating rendering instructions for various UI features, such as UI controls, display characteristics (e.g., visual encoding), and so on, for enabling user access to enterprise data, such as sales data maintained in the sales data database 20, and software functionality.

For the purposes of the present discussion, software functionality may be any function, capability, or feature (e.g., stored or arranged data) that is provided via computer code, i.e., software. Generally, software functionality may be accessible via use of a UI and accompanying UI controls and features. Software functionality may include actions, such as retrieving data pertaining to a computing object (e.g., business object); performing an enterprise-related task, such as recording business notes, displaying appointment information, specifying task to complete, order processing, calculating analytics, launching certain dialog boxes, performing searches, and so on.

A UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, wherein the input affects a UI display screen and/or accompanying software application associated with the software.

In operation, a user interacts with the GUI software 26 via the touch screen 24 and other I/O mechanisms, such as the speaker 32 and microphone 34. Initially, the user employs the touch display 24 to input login credentials, such as username and password. The login credentials, which represent user identity information, are then forwarded to the identity management system 16. The identity management system 16 then ensures that user only has access to cloud-based data and functionality that is permitted based on specified privileges or permissions associated with the user identity maintained via the identity management system 16. Hence, when a user initially logs into the system 10 via the GUI software 26, the identity management system 16 is then invoked (e.g., via a call routed through the controller 28) to determine and enforce privileges or permissions associated with the user.

For the purposes of the present discussion, an identity of a user may be any information identifying a user. For example, a user's identity may include login information, email address, phone number, name, and so on. Certain embodiments discussed herein may employ any of such identifying information to facilitate determining a mostly likely command intended by particular language input. Privileges, permissions, and so on, associated with a user, may be any identity information or associated information that limits what enterprise software functionality, e.g., actions and data a user has access to. User identity information and privileges represent a type of user context information.

In general, the GUI software 26 facilitates software navigation of cloud-based content, such as content maintained via the sales data database 20, and facilitates access to associated cloud-based functionality. In the present example embodiment, the cloud-based functionality includes software functionality implemented in part via an identity management system 16, the NLP engine 18, a voice server 22, and database software 20.

The GUI software 26 is adapted to handle voice input, e.g., via the microphone 32, and may include speech-to-text software 34 (Nuance™) for translating spoken language into electronic text. The electronic text may then be converted to software commands or data parameters (e.g., to update database objects or other computing objects, as discussed more fully below). Alternatively, speech-to-text conversion is implemented via a cloud-based service. Alternatively, or in addition, voice files may be forwarded, via the controller 28 and voice server 22, to the server-side NLP engine 18 for further processing into electronic text and associated software commands and/or parameters.

The NLP engine 18 includes computer code adapted to reference context information gathered by the GUI software 26 and/or cloud-based modules 16-22, to facilitate processing natural language and interpreting associated commands and parameters. The context information may include user context information, derived in part via the identity management system 16; subject context information, derived in part based on user selection of one or more computing objects maintained via the sales data database 20; and action context information, derived in part based on a particular software flow or user interaction sequence being implemented via the GUI software 26 and presented via the touch display 24.

For example, user voice input to the microphone 32 may be converted into electronic text, e.g., via the NLP engine 18 and/or client-side speech-to-text converter 34. Computer code running on the NLP engine 18 then processes the electronic text, analyzing it and partitioning it into commands or parameters. Commands and data are then further processed with reference to context information to facilitate filtering language interpretations and to accurately infer meanings and data from the language input.

User voice input may specify a particular computing object, e.g., opportunity object maintained via the sales data database 20. The computing object provides subject context information, as discussed more fully below. User voice input may further specify an action, such as "Create Task" or "Create Note," which then specifies a software flow, which provides action context information, as discussed more fully below.

In the present specific embodiment, the name of an action flow represents an action category. An action category may be any named grouping of one or more software steps or actions. For example, such a grouping may represent a collection of one or more related software flows. Example action categories corresponding to particular flows include, for example, a create-action category, a view-contacts category, and so on. Particular actions of a given software flow are said to be in the action category associated with the software flow.

A software flow may be any sequence of one or more steps for facilitating completion of a given software action, such as displaying contacts associated with the user; editing an opportunity object; viewing data pertaining to one or more opportunity objects; viewing data pertaining to a task; viewing a note; creating a note; creating an appointment; adding contact information to a database; facilitating editing data maintained via one or more computing objects. In the present specific embodiment, a given software flow (also simply called "flow" herein) may be associated with a task, such that upon completion or cancellation of a flow, a corresponding task will be completed or canceled.

A software action may be any process or collection of processes or operations implemented via software. Additional examples of processes include updating or editing data in a database, placing a product order, creating an opportunity business object, creating a business contact object, adding a revenue line to a business object, displaying data visualizations or analytics, triggering a sequence of processes, launching an ERP software application, displaying a dialog box, and so on. The terms "software action" and "action" are employed interchangeably herein.

For the purposes of the present discussion, a computing object may be any collection of data and/or functionality. Examples of computing objects include a note, appointment, a particular interaction, a task, an opportunity object containing information associated with a client, contact, or other business entity, and so on.

Computing objects (also simply called "objects" herein) may include sub-computing objects. For example, an opportunity object for a particular business client may contain sub-objects pertaining to particular appointments, meetings, notes, and so on, associated with that client. Examples of data that may be included in an object include text of a note (e.g., a description); subject, participants, time, and date, and so on, of an appointment; type, description, customer name, and so on, of an interaction; subject, due date, opportunity name associated with a task, and so on. An example of functionality that may be associated with or included in an object include issuing a reminder for an appointment, updating or creating an appointment, creating a task, creating a note, and so on.

A business object may be any object used to organize information for business purposes. An example business object may be formed by creating a name for the business object, such as "CRM Opportunity 1" or "Goal 1" and then associating information with the name. For example, "CRM Opportunity 1" object may be associated with a conversation, one or more enterprise personnel, one or more kudos assigned to a team that is associated with the object, and so on. Data that is associated with a business object may be contained within a data structure or database associated with the object, or the information may be distributed among different applications, computers, and so on, without departing from the scope of the present teachings.

For the purposes of the present discussion, an opportunity object may be any business object that includes information pertaining to or is otherwise associated with a business contact, customer, entity (e.g., corporation or other business), project, or other business endeavor. Accordingly, the terms "business object" and "opportunity object" can be employed interchangeably, e.g., when discussing sales data and CRM systems.

In the present specific embodiment, the NLP engine 18 includes computer code for employing the subject context and the action context to interpret language input provided after determination of the subject context and action context. Operations performed by the NLP engine 18 and implemented in computer code thereof may partition language input into one or more categories, including the action category or a parameter category.

A portion of language input may characterize an action category. The portion of language input may include a specification of a software action applicable to the computing object associated with the subject category.

Another portion of language input may characterize or specify one or more parameters (e.g., note contents, appointment details, etc.) associated with the parameter category, such as a specification of information to be stored in association with the computing object. The indicated software action may include activation of software functionality to facilitate, for example, creation of a note to be associated with the subject category. Note details, i.e., contents, may comprise the one or more parameters.

Hence, the GUI software 26 is characterized by a UI framework, which may be organized in accordance with a business object or subject, e.g., opportunity object, and further organized into different flows pertaining to tasks applicable to the computing object. UI display screens implemented via the GUI software 26 are structured in accordance with a UI framework (also called "architecture" herein). Various menus, lists, UI controls, displayed conversation flows, and so on, may be employed to facilitate user navigation of content and functionality, such as sales content maintained via the sales data database 20, as discussed more fully below.

In the present example embodiment, the sales data database 20 represents a Customer Relationship Management (CRM) database. The overall system 10 represents a CRM system implementing CRM software. For the purposes of the present discussion, CRM software may be any enterprise software that includes computer code for facilitating implementing one or more processes or software actions to facilitate management of business-related interactions, such as company interactions with customers or prospective customers. Similarly, a CRM database may be any collection of customer related data, such as corporate sales data. Depending upon usage context, a CRM database may sometimes refer to or otherwise include CRM software used to access stored business data.

For the purposes of the present discussion, navigatable content, such as the content 20, may be any electronic content that may be navigated via software navigation. Software navigation may be any manipulation of a software UI to view different UI display screens, which may display different data objects, documents, files, and so on. Hence, software navigation (also simply called "navigation" herein) may refer to a transition of a graphical UI display from a first display of one or more objects to a second display of one or more objects in response to user selection of an object or control in the first display of one or more objects.

Accordingly, when a user interacts with software to transition from a first display of one or more objects to a second display of one or more objects in response to user selection of an object or control in the first display of one or more objects, the user is said to navigate from first UI display screen to a second UI display screen or from the first set of one or more objects (e.g., a first folder, webpage, etc.) to the second set of one or more objects (e.g., a second folder, webpage, etc.).

A user is said to navigate data or to navigate a menu if the user selects one or more different displayed objects (i.e., representations of objects), items, or UI controls to activate display of other objects, UI controls, or items to be displayed. An object, such as a data object, may be any grouping of data and/or functionality. A representation of an object, i.e., a displayed object, may be displayed via graphical depiction, such as a menu item, dialog box, and so on. The graphical depiction of an object may also be called an object, a displayed object, or a node.

Hence, in the present example embodiment, the system 10 may collect context information, including user context and software context, via various mechanisms, such as via one or more user responses to a query; user answers to a questionnaire; monitoring of user software usage history; location information, underlying UI architectures or frameworks, data and/or functionality organizational frameworks (e.g., flows), and so on.

The GUI software 26, in communication with the cloud 14, is adapted to provide voice-selectable user options to access, change, or perform an action on enterprise data associated with the subject category. The user options may include, for example, a user option to provide manual selection of user options, in addition to voice selection. Information pertaining to manual selections may be represented graphically in a conversation flow illustrated via the touch screen 24.

Figure 2:
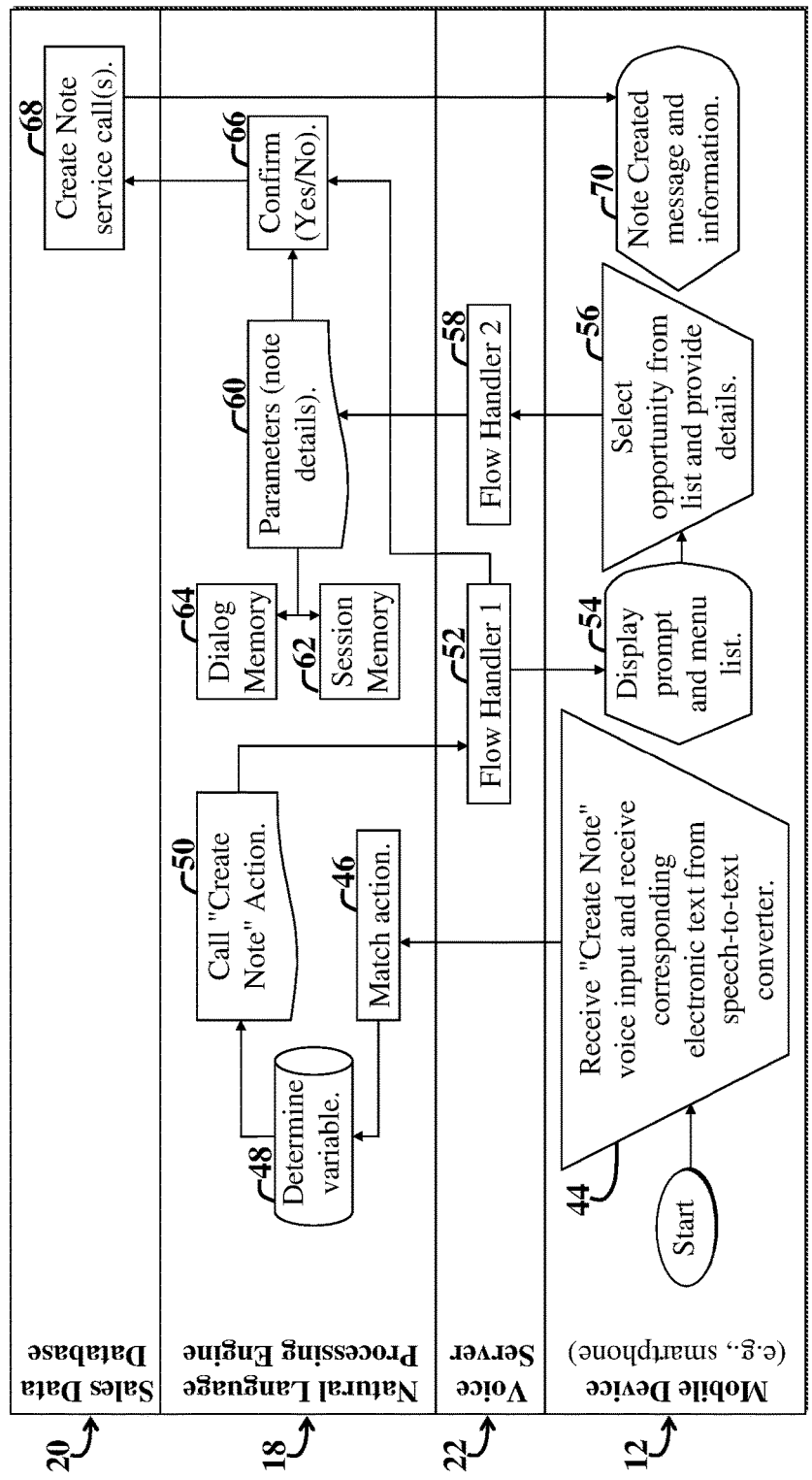
FIG. 2 is a flow diagram of a first example method illustrating example events and actions performed by various components of the system of FIG. 1 during a note-creation user interaction.

FIG. 2 is a flow diagram of a first example method 40 illustrating example events and actions 44-70 performed by various components 12, 18-22 of the system 10 of FIG. 1 during an example note-creation user interaction and corresponding implementation of a software flow.

With reference to FIGS. 1 and 2, a user employs the mobile device 12 to provide voice input during an initial note-creation initiating step 44. In the present example embodiment, the user of the mobile device 12 provides voice input specifying "Create note." The voice input is converted to electronic text via a speech-to-text converter and subsequently forwarded to the NLP engine 18, which implements a match action step 46.

The match action step 46 analyzes the electronic text to interpret the text and identify parameters or commands indicated thereby. In the present example embodiment, a variable determination step 48 determines that the electronic text includes a variable representing a command or request to begin a "Create Note" software flow. This results in a call 50 to a "Create Note" software flow for implementing a "Create Note" software action or task and associated flows.

Subsequently, a first flow-handling step 52 is performed by the voice server 22. The first flow-handling step 52 includes analyzing the call to the "Create Note" action of step 50 to determine if any parameters are missing from the call.

If parameters, such as a specification of an opportunity object (representing subject context information), are missing from the function, procedure, or service call to implement the "Create Note" action, then software running on the mobile device 12 triggers display of a prompt and appropriate list via a prompt-displaying step 54.

The mobile device 12 then implements an opportunity-selection step 56, which involves receiving a user selection of an opportunity from a list. Any available details or data pertaining to the selected opportunity object from the list and that are immediately available to the mobile device 12 are then forwarded to a second flow handler 58 of the voice server 22.

The second flow handler 58 passes information pertaining to the selected opportunity to the NLP engine 18. The NLP engine 18 then implements a parameter-presenting step 60, which initiates software processes to display parameter details on the touch display 24 of the mobile device 12 of FIG. 1. Parameter details may be stored in dialog memory 64 and session memory 62.

Once the parameter details are confirmed in a confirming step 66, then one or more "Create Note" service calls 68 are implemented, in part via the sales data database 20. The mobile device 12 and accompanying software then illustrate, in a note-creation-illustration step 70, a message identifying the created note and related information, such as note contents.

If in the first flow-handling step 52, the voice server 22 determines that the call for a "Create Note" action 50 includes all requisite parameters, e.g., identification of an associated opportunity object; then the confirmation step 66 is performed, followed by implementation of "Create Note" service calls 68. After the note is created, a corresponding note-created message is displayed in a note-illustrating step 70.

Figure 3:
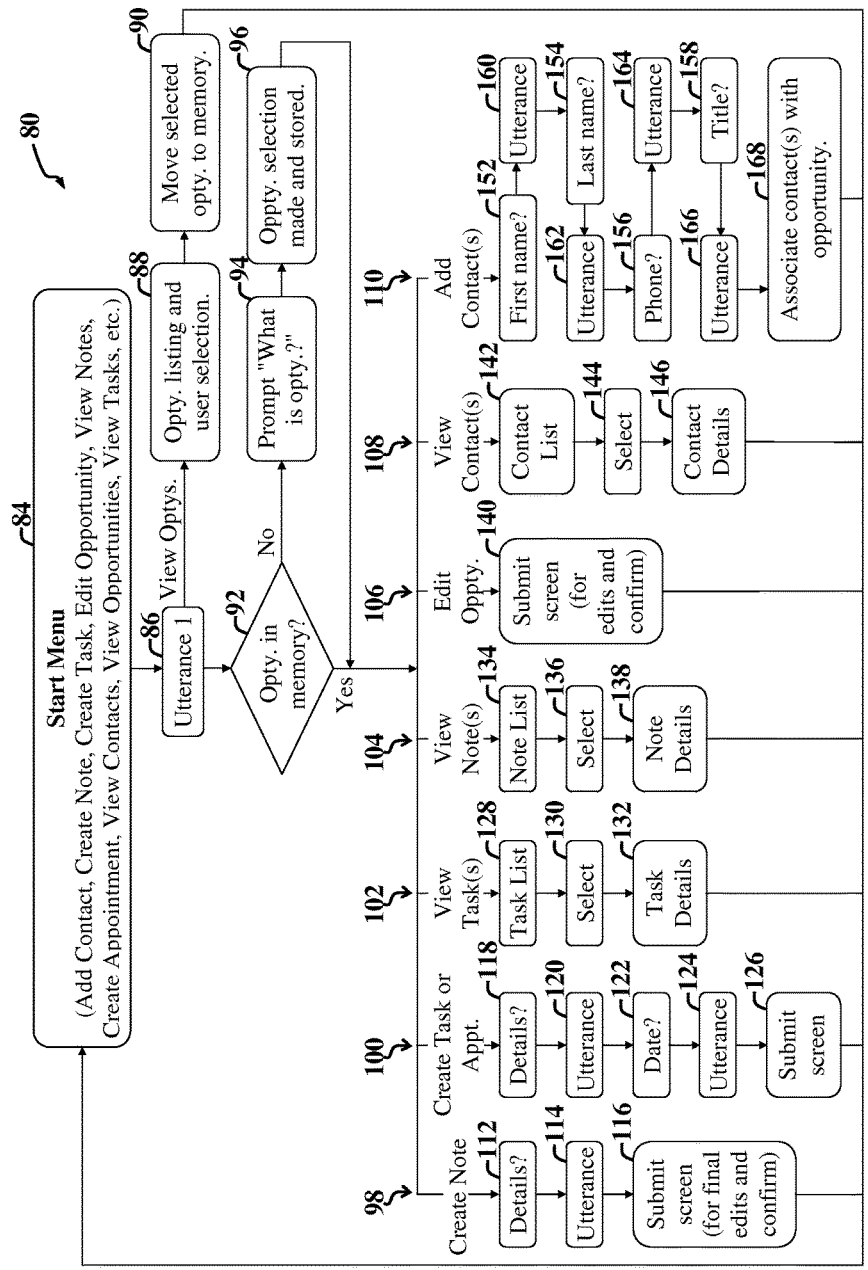
FIG. 3 is a flow diagram of a second example method illustrating various example user interaction flows, including note creation, appointment or task creation, task viewing, note viewing, contact viewing, and contact addition, which are implementable via the system of FIG. 1.

FIG. 3 is a flow diagram of a second example method 80 illustrating various user interaction flows 98-110, including note creation 98, appointment or task creation 100, task viewing 102, note viewing 104, contact viewing 108, and contact addition 110, which are implementable via the system 10 of FIG. 1. With reference to FIGS. 1 and 3, the GUI software 26 of the mobile device 12 presents a start menu displayed via the touch display 24 in an initial start-menu-displaying step 84.

A user then selects one or more user options from the start menu by providing an instance of voice input (or other language input or touch interaction with an associated UI display screen), i.e., a first utterance 86. If the first utterance 86 or other user input indicates user selection of a "View Opportunities" user option, then an opportunities-displaying step 88 is implemented, whereby a list of opportunities is presented via the touch display 24 of FIG. 1, enabling a user to select one or more opportunities.

Information pertaining to the selected opportunity object is stored in memory, such as Random Access Memory (RAM) or other runtime memory, in an opportunity-storing step 90. The stored opportunity object represents subject context information. Subsequently, the start menu step 84 is re-displayed while the selected opportunity object is maintained in memory.

If after the first utterance step 86, an opportunity object is determined to be loaded into memory, e.g., as determined in an opportunity-checking step 92, then one or more of the software flows 98-110 are initiated. Otherwise, an opportunity-prompting step 94 is displayed via the touch display 24 of FIG. 1. The prompt may include a computer-provided voice prompt (e.g., via the speaker 32 of FIG. 1 and a corresponding text prompt) asking the user to specify an opportunity, which identifies an opportunity object.

The underlying software then determines the specified opportunity, in an opportunity-selection step 96. The selected opportunity is loaded into memory, and the one or more flows 98-110 are then initiated in accordance with the utterance 86.

If the first utterance 86 indicates a spoken command (or other input) to create a note, then a create-note flow 98 is initiated. The example create-note flow 98 includes prompting the user for any missing details 112; receiving a second responsive utterance 114; then displaying a confirmation screen (also called a submit screen) for enabling user confirmation of note details 116.

If the first utterance 86 indicates a spoken command to create a task or appointment, then a create-task flow 100 is initiated. The create-task flow 100 includes prompting the user for task details 118; receiving a third responsive utterance 120; prompting, as needed depending upon the context, for date information 122 pertaining to the task or appointment to be created; receiving a fourth responsive utterance 124; the processing the utterance and displaying a corresponding confirmation screen confirming task and/or appointment details 126.

If the first utterance 86 indicates a spoken command to view one or more tasks, then a view-tasks flow 102 is initiated. The view-tasks flow 102 includes displaying a list of tasks 128 pertaining to the selected opportunity; receiving user input 130 selecting a task from the lists of task; then displaying task details 132.

If the first utterance 86 indicates a spoken command to view one or more notes, then a view-notes flow 104 is initiated. The view-notes flow 104 includes displaying a list of notes 134 pertaining to the previously selected opportunity; receiving user input 136 selecting a note to view; then displaying note details 138, such as note content, time, date, and so on.

If the first utterance 86 indicates a spoken command to edit an opportunity, i.e., details (data) of an opportunity computing object, then an edit-opportunity flow 106 is initiated. The edit-opportunity flow 106 includes retrieving, for display, information pertaining to an opportunity object loaded in memory 140.

If the first utterance 86 indicates a spoken command to view contacts, then a view-contacts flow 108 is initiated. The view-contacts flow 108 includes listing available contacts 142 associated with the loaded opportunity object; receiving user input selecting a contact from the list 144; then displaying contact details 146.

If the first utterance 86 indicates a spoken command to add a contact, then an add-contact flow 110 is initiated. The add-contact flow 110 includes a sequence of voice and/or text prompts 152-158 and corresponding user responses 160-166 to identify and store contact information, such as first and last name, phone number, title, and so on. The resulting contact information is then associated with the loaded opportunity object in a contact-associating step 168.

After completion of one of the flows 98-110, then the initial start menu is displayed in the start-menu step 84.

Figure 4:
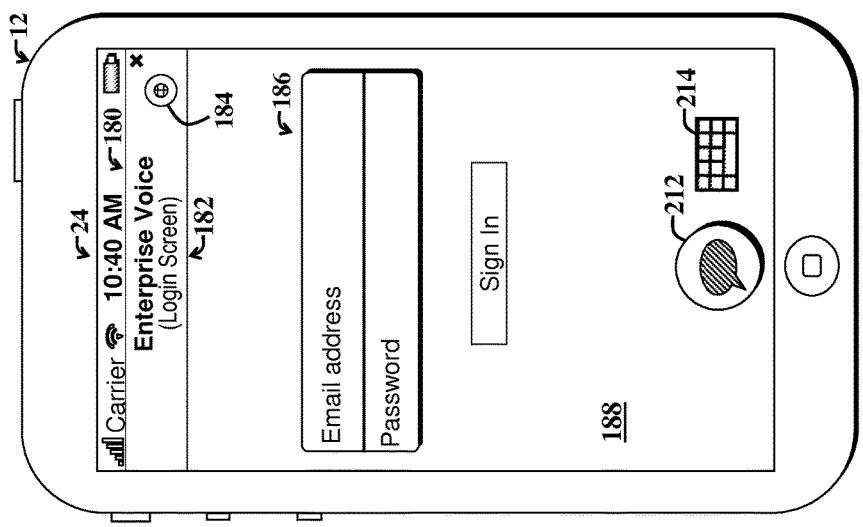
FIG. 4 illustrates a first example user interface display screen showing an example login screen for the mobile device and accompanying software of FIG. 1.

FIG. 4 illustrates a first example UI display screen 180 representing an example login screen for the mobile device 12 and accompanying software of FIG. 1. For the purposes of the present discussion, a UI display screen may be any software-generated depiction presented on a display. Examples of depictions include windows, dialog boxes, displayed tables, and any other graphical UI features, such as UI controls, presented to a user via software, such as a browser. A UI display screen contained within a single border is called a view or window. Views or windows may include sections, such as sub-views or sub-windows, dialog boxes, graphs, tables, and so on. In certain cases, a UI display screen may refer to all application windows presently displayed on a display.

The login screen 180 includes a header bar 182 with an accompanying settings icon 184. The user icon 184 represents a UI control that provides a user option to access and/or specify underlying software settings, such as a specification of a Uniform Resource Locator (URL) suitable for accessing user data via the sales data database 20 of FIG. 1.

The login screen 180 further includes various fields and buttons 186 for facilitating receiving user login credentials, such as username and password. The login screen includes a color-coded background 188 specifying that the user is in a portion of the UI framework occurring before initiating a particular software flow. UI display screens associated with different software flows are color coded, or otherwise visually coded, to provide context information to the user.

For the purposes of the present discussion, visual coding may be any mechanism for visually distinguishing a UI feature to provide context information to the user. The context information may include, for example, information indicating that information presented via a UI display screen pertains to a particular software flow.

For example, a background of a UI display screen may change colors to indicate different software flows being performed. The use of different colors in the background represents a type of visual coding. Other examples of visual coding include activating a halo or outline around a voice widget or UI control when the underlying software is receiving spoken language, i.e., voice input, also called language input. The terms "visual coding" and "visual encoding" are employed interchangeably herein.

After the user employs the login screen 180 to log into underlying software, the identity management system 16 of FIG. 1 may use the identity information to narrow a set of possible opportunity objects, corresponding software flows, and so on, which may be accessed via the underlying software during the user interaction. Those skilled in the art will appreciate that such user context information may facilitate interpretation of voice input by the NLP engine 18.

Figure 5:
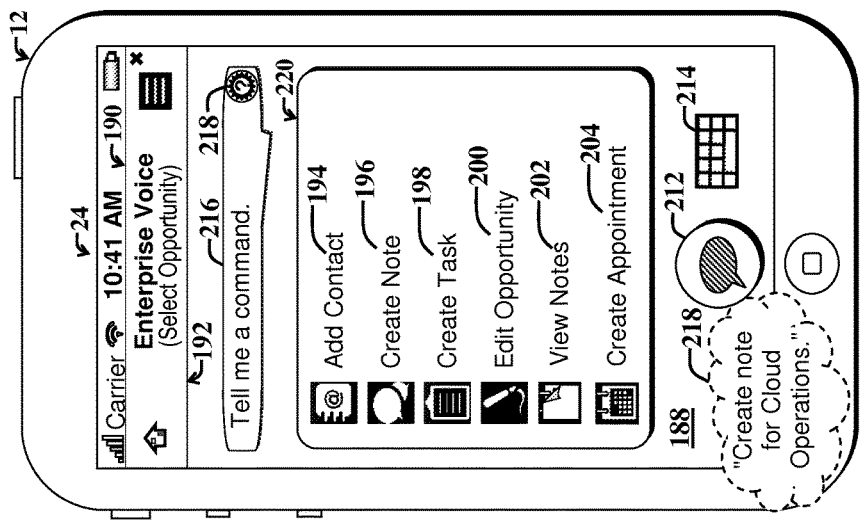
FIG. 5 illustrates a second example user interface display screen showing an example start menu for the mobile device and accompanying software of FIG. 1.

FIG. 5 illustrates a second example UI display screen 190 showing an example start menu 220 for the mobile device 12 and accompanying software 26 of FIG. 1. The UI display screen 190 may represent a home screen for underlying software (called "Enterprise Voice" herein). At any time a user speaks "Home" or "Cancel" during interaction with the software, the UI display screen 190 may appear. If a user speaks "Help" or "Info" a help screen may appear.

The second UI display screen 190 includes a header bar 192 indicating the current status of the underlying software, as consistent with background color coding 188. In the present example, the header bar indicates "Select an Opportunity."

A prompt UI control 216 includes a software-generated prompt asking the user to specify a command. An information or help icon 218 provides a user option to display further information characterizing or explaining a given prompt.

A list section representing the start menu 220 includes UI controls 194-204 to enable a user to select, e.g., via a touch screen or via voice input, one or more user options from the start menu 220. The different UI controls 194-204 may represent different user options to select software flows to implement tasks or sequences of tasks identified by the names of the UI controls 194-204.

Example user options include an option to add a contact 194; to create a note 196; to create a task 198; to edit an opportunity 200; to view notes 202; to create an appointment 204, and so on. Additional user options, which may be revealed through scrolling (e.g., via tap and drag), include user options to view contacts, to view opportunities, and so on. The various user options 194-204 may correspond to different software flows 98-110 of the method of FIG. 3.

Figure 6B:
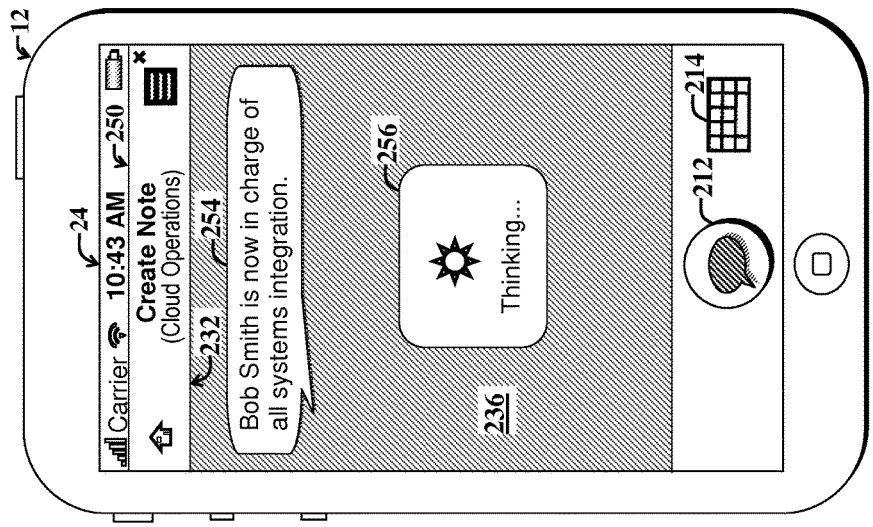
FIG. 6B illustrates a fourth example user interface display screen indicating that underlying software is processing a voice command pertaining to a note to be created.
Figure 6A:
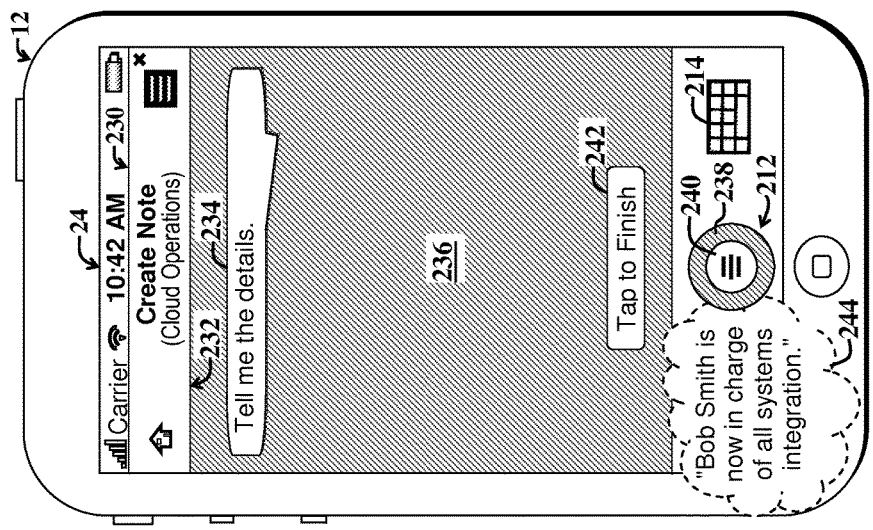
FIG. 6A illustrates a third example user interface display screen showing an example voice button or widget indicating that underlying software is detecting or receiving voice input as a user speaks a command to create a note.

In the present example embodiment, in response to the prompt 216, the user provides voice input 218 specifying to "Create note." This then triggers display of the third UI display screen 230 of FIG. 6A.

FIG. 6A illustrates a third example UI display screen 230 showing an example voice widget 212 indicating that underlying software is detecting or receiving voice input as a user speaks a command to create a note.

A title bar 232 indicates that the current subject context represented by the name "Cloud Opportunity" referring to the underlying cloud opportunity object. The action context is represented by the name "Create Note," which corresponds to a software flow (e.g., the flow 98 of FIG. 3). In general, underlying software flows are organized in accordance with particular opportunity object. The specified opportunity object (e.g., "Cloud Operations") provides additional context associated with the flow.

A color coded background 236 is colored to indicate that the current flow pertains to the "Create Note" flow. Note that UI display screens employed to implement different software flows will have different colors, hatching, texture, or other visually distinguishing aspects. This facilitates conveying context information to a user, i.e., acts as a context cue.

A details prompt 234 asks the user to specify more details pertaining to a note to be created. As the user speaks in a note, e.g., in response to pressing the voice widget 212, the widget 212 becomes highlighted by a halo 238 surrounding the widget 212, and the center of the widget 212 (also called voice button) displays a microphone grill 240. Such visual encoding, i.e., use of the grill 238 and halo 240, provides context information to the user, indicating that the underlying software is currently detecting and receiving language input. An optional tap-to-finish button 242 provides a user option to specify an end to an instance of language input.

Note that the halo 238 may be implemented via an animation, which may have oscillating intensity, colors, and so on. Exact animation details are implementation specific and may vary without departing from the scope of the present teachings. Animating a color coded (or otherwise visually coded) halo around the voice button 212 may further facilitate indicating detection of speech related to the color-coded context represented by the colored background 236. For example, the halo 238 may have similar colors or features as the "Create Note" background 236.

A keypad icon 214 provides a user option to trigger display of a soft keypad, to facilitate receiving typewritten language input. The soft keypad 214 may be omitted without departing from the scope of the present teachings.

In the present example embodiment, when the halo 238 is highlighted, the user is speaking a note 244, such as "Bob Smith is now in charge of all systems integration."

FIG. 6B illustrates a fourth example UI display screen 250 indicating, via a thinking indicator 256, that underlying software is processing a voice command pertaining to a note to be created. A text version of a spoken note 254 is also displayed against the create-note background 236.

The text field 254 represents a conversation indicator, displaying a portion of a conversation flow. The conversation flow is guided by the underlying software flow.

Figure 6C:
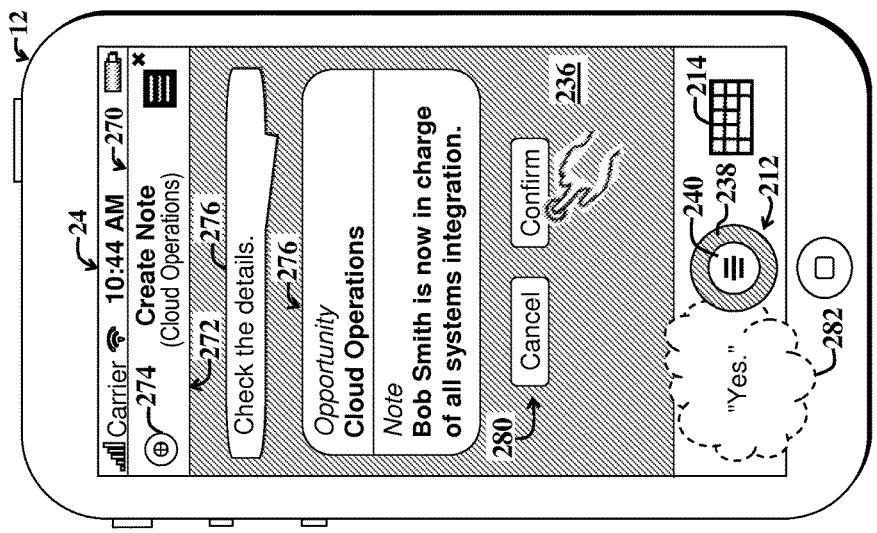
FIG. 6C illustrates a fifth example user interface display screen, which represents a note confirmation screen indicating example details of a created note and asking for user confirmation of the note.

FIG. 6C illustrates a fifth example UI display screen 270, which represents a note confirmation screen indicating example details 278 of a created note and asking for user confirmation of the note via a confirmation prompt 276. Cancel and confirm buttons 280 provide user options for confirming note details 278 or canceling creation of the note.

The fifth example UI display screen 270 includes an updated header bar 272, with a settings option 274 to activate a settings menu. Such a settings menu may provide various user options, such as user options to specify URLs for which to store different notes.

In the present example embodiment, the user taps the confirm button of the buttons 280 or otherwise provides confirming voice input 282 saying "Yes." After confirmation of the note, a home screen is displayed, where the note details are included in a conversation flow, as discussed more fully below with reference to FIG. 7.

Figure 7:
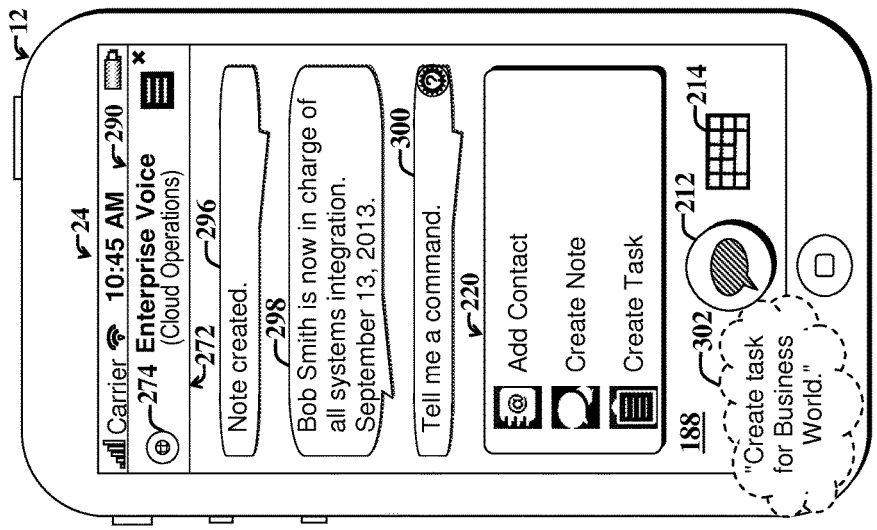
FIG. 7 illustrates a sixth example user interface display screen, which represents a start menu appearing after an opportunity has been selected and after user confirmation of the note indicated in FIG. 6C.

FIG. 7 illustrates a sixth example UI display screen 290, which shows a start menu 220 and represents a home screen appearing after an opportunity has been selected and after user confirmation of the note 278 indicated in FIG. 6C.

The sixth example UI display screen 290 displays a conversation flow 296-300, including a first indication 296 that a note has been created, a second indication 298 of the note contents, and a third prompt 300 asking the user to provide a command. Commands may be spoken or otherwise selected from the list 220, e.g., via touch input.

The header bar 272 continues to indicate that the subject context currently pertains to the "Cloud Operations" opportunity object, which has been earlier loaded into memory (e.g., in response to the user voice input 218 shown in FIG. 5).

In the present example embodiment, the user provides additional voice input 302, saying "Create task for Business World." The term "Business World" is interpreted by the underlying software to represent an opportunity object with the term "Business World." However, several opportunity objects have the term; so a selection list is presented, as discussed more fully below with reference to FIG. 8.

FIG. 8 illustrates a seventh example UI display screen 310, which represents an opportunity confirmation screen appearing after a user has spoken a command to create a task for a particular opportunity from the sixth example UI display screen 290 of FIG. 7.

The underlying software issues an opportunity-prompt 314 asking the user to further specify the applicable opportunity object, i.e., subject context. A subsequently display opportunity list 316 indicates various possible user selectable opportunity objects.

In the present example embodiment, the user speaks "Business World Server Elite" 318 to select the corresponding opportunity from the list 316. Alternatively, the user selects the opportunity by tapping the indication of the opportunity in the list.

Note that the color coding of the background 188 shifts to indicate that the current software flow context is no longer represented by a create note flow, but instead pertains to selection of an opportunity or other subject context.

FIG. 9A illustrates an eighth example UI displays screen 330 illustrating an example user interaction 350 to create a task after a user has selected an opportunity from the seventh example UI display screen 310 of FIG. 8.

The eighth example UI display screen 330 includes an updated header bar 332 indicating that the pertinent opportunity is "Business World Server Elite" and that the current software flow, i.e., action context, pertains to creation of a task. The color or other visual encoding of the background is shifted to indicate a create-task background 356.

A conversation flow representing the interaction 350 includes prompts 336, 340, 346 and corresponding responses 338, 342. The user is prompted to specify a task 336 and to specify the due date 340. Task details 346 are displayed in the conversation flow 336-346 near the bottom of the screen 330 (which may be further revealed by scrolling down, e.g., via tap and downward drag) in the present example embodiment. Note that an additional prompt asking the user to confirm details may be inserted after the user response 342 to the date prompt 340. In the present example embodiment, the prompt is omitted, as the confirmation prompt may be explicitly implied via cancel and confirm buttons to be revealed at the bottom of the details section 346 when a user scrolls downward.

Note that the various UI display screens shown herein may be scrollable. For example, the conversation flow 350 may be scrolled upward to reveal cancel and confirm buttons. Alternatively, or in addition, the user may simply provide voice input indicating "Cancel" or "Confirmed (or 'Yes')" as desired.

Figure 9B:
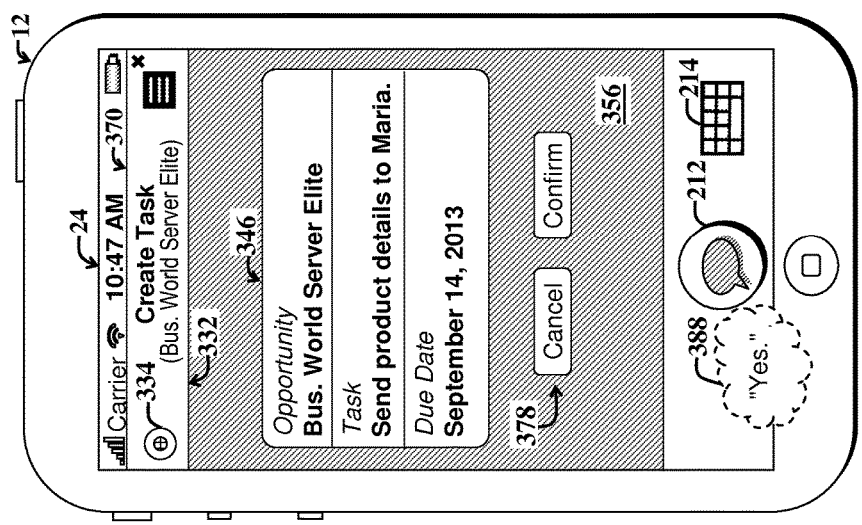
FIG. 9B illustrates a ninth example user interface display screen, which represents a task confirmation screen and which may appear after the user interaction indicated in the eighth example user interface display screen of FIG. 9.

FIG. 9B illustrates a ninth example UI display screen 370, which represents a task confirmation screen and which may appear after the user interaction indicated in the eighth example UI display screen 330 of FIG. 9. In particular, the user has scrolled the conversation flow 350 of FIG. 9A upward to reveal the UI display screen 370 of FIG. 9B, including cancel and confirm buttons 378.

In the present example embodiment, the user states "Yes" 388 to confirm the task details 346. The task details 346 may represent parameters parsed from earlier supplied language input.

After the user confirms the notes 346, a home screen may be displayed, such as the UI display screen 190 of FIG. 5. However, the "Business World Server Elite" opportunity may remain the selected opportunity (i.e., may remain loaded into memory) until the user specifies another opportunity.

Figure 10:
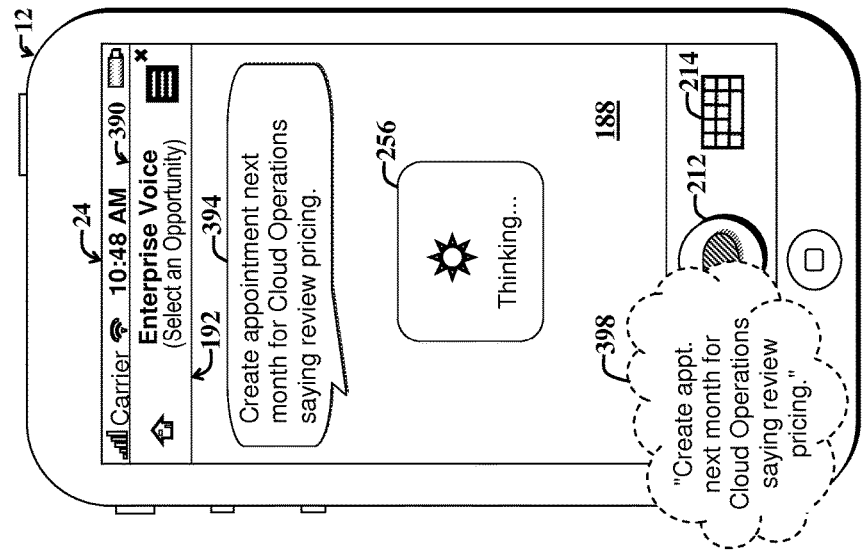
FIG. 10 illustrates a tenth example user interface display screen after a user has employed the second example user interface display screen of FIG. 5 to initiate creation of an appointment for a specified opportunity and characterized by specified details.

FIG. 10 illustrates a tenth example UI display screen 390 after a user has employed the second example UI display screen 190 of FIG. 5 to initiate creation of an appointment for a specified opportunity and characterized by specified details. Note that the background 188 has switched to a similar background as that shown in FIG. 5.

In the present example embodiment, the user provides voice input 398, which is converted to electronic text 394, asking the underlying software to create an appointment next month for Cloud Operations saying review pricing. After the user provides the language input 394, the thinking icon 256 is displayed, indicating that the underlying software is currently processing the language input and associated request or command.

Figure 11:
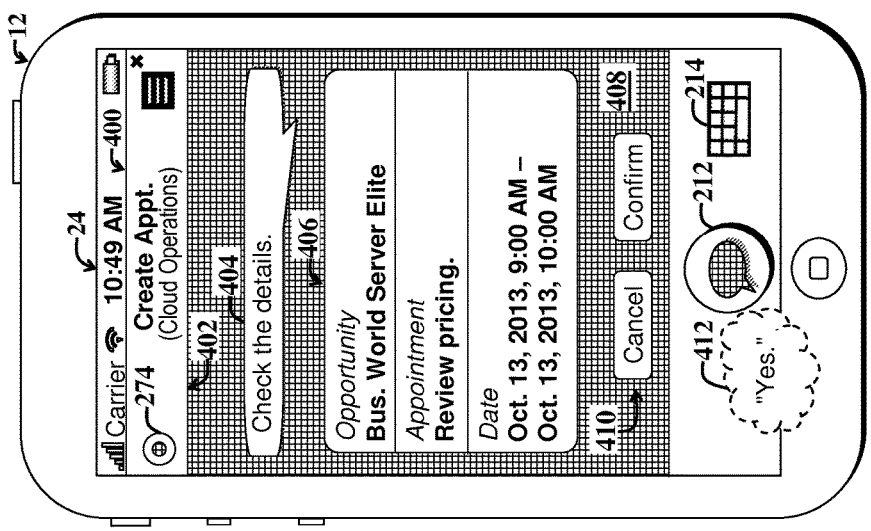
FIG. 11 illustrates an eleventh example user interface display screen, which represents an appointment confirmation screen, and which may appear after the tenth example user interface display screen of FIG. 10.

FIG. 11 illustrates an eleventh example UI display screen 400, which represents an appointment confirmation screen, and which may appear after the tenth example UI display screen 390 of FIG. 10. An updated background 408 is color coded to indicate that the current software flow pertains to creation of an appointment.

The voice input 394 provided via the UI display screen 390 of FIG. 10 has been parsed by underlying software, which determines that the specified opportunity is "Cloud Operations," as indicated in an updated title bar 402, and that the associate software flow pertains to creation of an appointment.

The eleventh example UI display screen 400 includes a confirmation prompt 404 to check details 406 of the appointment to be created. A user may confirm by speaking "Yes." 412 or by selecting from among the cancel and confirm buttons 410.

Figure 12:
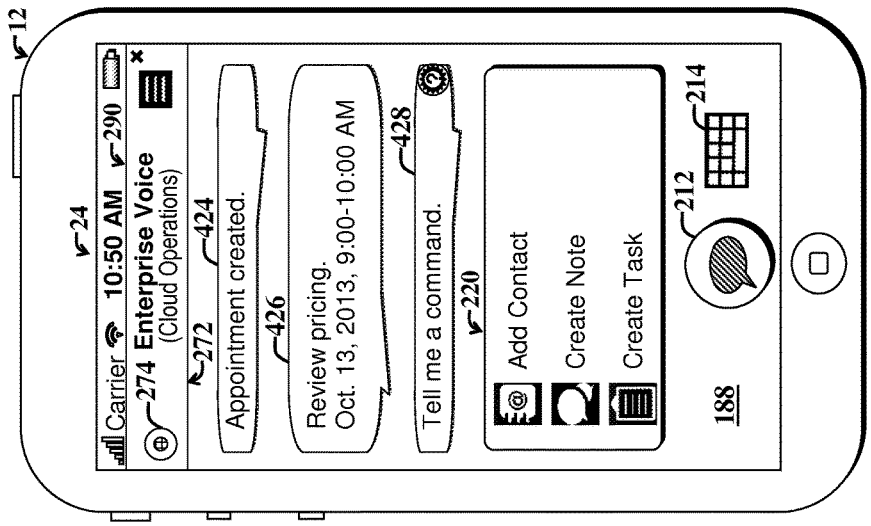
FIG. 12 illustrates a twelfth example user interface display screen, which represents a start menu, and which may appear after the eleventh example user interface display screen of FIG. 11.

FIG. 12 illustrates a twelfth example UI display screen 420, which presents a start menu 220, and which may appear after the eleventh example UI display screen 400 of FIG. 11.

The UI display screen 420 illustrates a conversation flow 424-428 indicating that an appointment was created 424; appointment details 426, and a command prompt 428 asking the user to specify a command. The options list 220 provides various user options to initiate a specified software flow, such as a flow pertaining to adding a contact, creating a note, and so on.

Figure 13:
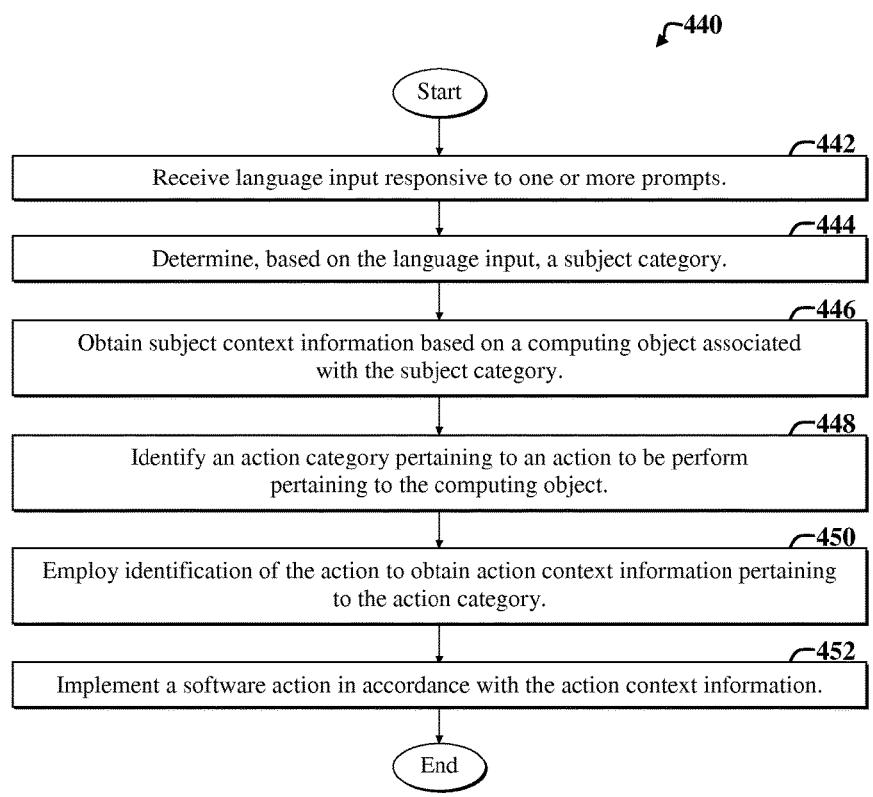
FIG. 13 is a flow diagram of a third example method adapted for use with the embodiments of FIGS. 1-12.

FIG. 13 is a flow diagram of a third example method 440 adapted for use with the embodiments of FIGS. 1-12. The method 440 includes a first step 442, which involves receiving language input responsive to one or more prompts.

A second step 444 includes determining, based on the language input, a subject category. The subject category may be identified by a computing object, such as a particular opportunity object.

A third step 446 includes obtaining subject context information based on a computing object associated with the subject category. For example, subject context may include information pertaining to a "Cloud Operations" opportunity object.

A fourth step 448 includes identifying an action category pertaining to an action to be performed pertaining to the computing object. The action category may correspond to a software flow.

A fifth step 450 includes employing identification of the action to obtain action context information pertaining to the action category. The action context information may further specify a particular location in a software flow, without departing from the scope of the present teachings.

A sixth step 452 includes implementing a software action in accordance with the action context information. Examples of software actions include creation of a note, creation of a task, creation of an appointment, and so on.

Note that the method 440 may be augmented or changed without departing from the scope of the present teachings. For example, an alternative method includes accepting a signal from a UI device to initiate voice recognition; identifying one or more words uttered by a user; comparing the one or more words against a context defined at least in part by a task flow (i.e., software flow); and using the result of the comparison to identify a command represented at least in part by the uttered one or more words.

The method 440 may further include a method for parsing and/or interpreting or handling language input via the first step 442. An example such method includes partitioning language input into one or more categories, including the action category and/or a parameter category. A portion of language input characterizing an action category includes a specification of a software action applicable to the computing object associated with the subject category. Similarly, a portion of language input characterizing one or more parameters associated with the parameter category may include a specification of information to be stored in association with the computing object. For example, the specified information may include details of a note, wherein the note details represent one or more parameters.

Hence, certain embodiments discussed herein are particularly suited to facilitate voice processing by confining particular software flows to specific subject matter, thereby narrowing the scope of terms likely to be used. Different types of context information may be employed to guide flows; structure the flows; and implement tasks accordingly.

Although the description has been described with respect to particular embodiments thereof, these particular embodiments are merely illustrative, and not restrictive.

For example, certain embodiments have been discussed herein primarily with reference to mobile device UIs and accompanying NLP software implemented via a Service Oriented Architecture (SOA) involving software running on mobile client and server systems, embodiments are not limited thereto. For example, various methods discussed herein may be implemented on a single computer. Furthermore, methods may involve input other than spoken voice, e.g., input provided via text messages, emails, and so on, may be employed to implement conversation flows in accordance with embodiments discussed herein.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for facilitating user interaction with enterprise software via a mobile computing device, the mobile computing device including a runtime memory, the mobile computing device further coupled to a server memory via a network connection, the method comprising:
   receiving language input responsive to one or more prompts;
   determining, based on the language input, a subject category;
   determining that an opportunity object including enterprise information is associated with the subject category;
   checking whether the opportunity object is in the runtime memory and, if not, then retrieving the opportunity object from the server memory and storing it in the runtime memory;
   maintaining the opportunity object in the runtime memory and using the enterprise information in one or more of the following acts;
   obtaining subject context information;
   identifying an action category;
   employing identification of the action category to obtain action context information pertaining to the action category; and
   implementing a software action in accordance with the action context information.

2. The method of claim 1, wherein the method further includes receiving as input, identity information identifying a user of software used to implement the method.

3. The method of claim 2, further including employing the identity information to determine information associated with the user, including cloud-based enterprise data accessible to the user via the software and maintained via one or more computing objects.

4. The method of claim 2, further including employing a computing object to represent the subject category, such that user selection of the subject category results in user selection of the computing object.

5. The method of claim 4, wherein the enterprise data includes data specific to a user logged in to software employed to facilitate implementing the method, and wherein the enterprise data includes sales data accessible via a Customer Relationship Management (CRM) database.

6. The method of claim 4, further including employing the language input to determine the action category and action context information, wherein the action context information is characterized, at least in part, by a software flow.

7. The method of claim 6, further including indicating, via visual encoding in a user interface display screen, a software flow that is currently being implemented, wherein the software flow includes one or more sequences of steps that are adapted to facilitate implementation of the software action.

8. The method of claim 7, wherein the software action includes one or more of the following: displaying contacts associated with the user; editing an opportunity object; viewing data pertaining to one or more opportunity objects; viewing data pertaining to a task; viewing a note; creating a note; creating an appointment; adding contact information to a database; facilitating editing data maintained via one or more computing objects.

9. The method of claim 1, further including employing the language input to determine one or more data parameters to be associated with a computing object and a software action pertaining to a software flow, wherein the software flow identifies, at least in part, action context information.

10. The method of claim 1, further including employing the subject context and the action context to interpret language input provided after determination of the subject context and action context.

11. The method of claim 10, further including partitioning language input into one or more categories, including the action category or a parameter category.

12. The method of claim 11, wherein a portion of language input characterizing an action category includes a specification of a software action applicable to the computing object associated with the subject category.

13. The method of claim 12, wherein a portion of language input characterizing one or more parameters associated with the parameter category includes a specification of information to be stored in association with the computing object.

14. The method of claim 13, wherein the software action includes activation of software functionality to facilitate creation of a note to be associated with the subject category, wherein details of the note include the one or more parameters.

15. The method of claim 1, further including employing visual coding in a user interface display screen to illustrate context information characterizing a state of underlying software used to implement the method.

16. The method of claim 15, wherein the visual coding includes color coding of a voice widget, wherein the color coding indicates whether voice is being detected and received.

17. The method of claim 15, further including providing one or more user options to access, change, or perform an action on enterprise data associated with the subject category, wherein the one or more user options include a user option to provide manual selection of user options, in addition to voice selection, and providing representations of the user selections in a representation of a conversation flow illustrated via the user interface.

18. An apparatus comprising:
a mobile computing device, the mobile computing device including a runtime memory, the mobile computing device further coupled to a server memory via a network connection;
the mobile computing device further including a digital processor coupled to a display and to a processor-readable storage device, wherein the processor-readable storage device includes one or more instructions executable by the digital processor to perform the following acts:
receiving language input responsive to one or more prompts;
determining, based on the language input, a subject category;
determining that an opportunity object including enterprise information is associated with the subject category;
checking whether the opportunity object is in the runtime memory and, if not, then retrieving the opportunity object from the server memory and storing it in the runtime memory;
maintaining the opportunity object in the runtime memory and using the enterprise information in one or more of the following acts:
obtaining subject context information;
identifying an action category;
employing identification of the action category to obtain action context information pertaining to the action category; and
implementing a software action in accordance with the action context information.

19. A non-transitory computer-readable storage medium including instructions executable by a processor in a mobile computing device, the mobile computing device including a runtime memory, the mobile computing device further coupled to a server memory via a network connection, the computer-readable storage medium including one or more instructions for:
receiving language input responsive to one or more prompts;
determining, based on the language input, a subject category;
determining that an opportunity object including enterprise information is associated with the subject category;
checking whether the opportunity object is in the runtime memory and, if not, then retrieving the opportunity object from the server memory and storing it in the runtime memory;
maintaining the opportunity object in the runtime memory and using the enterprise information in one or more of the following acts:
obtaining subject context information;
identifying an action category;
employing identification of the action category to obtain action context information pertaining to the action category; and
implementing a software action in accordance with the action context information.

* * * * *

UNITED STATES PATENT AND TRADEMARK OFFICE
CERTIFICATE OF CORRECTION

PATENT NO. : 10,095,471 B2  
APPLICATION NO. : 14/475344  
DATED : October 9, 2018  
INVENTOR(S) : Dwivedi et al.

Page 1 of 1

It is certified that error appears in the above-identified patent and that said Letters Patent is hereby corrected as shown below:

In the Claims

In Column 19, Lines 44-45, in Claim 1, delete "category:" and insert -- category; --, therefor.

In Column 19, Line 55, in Claim 1, delete "acts;" and insert -- acts: --, therefor.

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*